United States Patent [19]

Sanden

[11] Patent Number: 5,259,647

[45] Date of Patent: Nov. 9, 1993

[54] LOW BED OVERSIZED TRAILER

[76] Inventor: Gregory L. Sanden, 8625 Boyson St., Downey, Calif. 90242

[21] Appl. No.: 845,351

[22] Filed: Oct. 2, 1992

Related U.S. Application Data

[63] Continuation of Ser. No. 635,690, Dec. 27, 1990, abandoned.

[51] Int. Cl.$^5$ ............................................. B62D 63/06
[52] U.S. Cl. ................................. 280/789; 280/414.1; 280/DIG. 8
[58] Field of Search ............... 280/789, 794, 797, 799, 280/800, 781, 414.1, 415.1, DIG. 8; 414/498

[56] References Cited

U.S. PATENT DOCUMENTS

| | | | |
|---|---|---|---|
| 3,697,098 | 10/1972 | Fisher | 280/415.1 |
| 3,967,743 | 7/1976 | Yoder | 280/DIG. 8 |
| 4,132,323 | 1/1979 | Simmons | 280/789 |
| 4,262,923 | 4/1981 | Weir | 280/415.1 |
| 4,599,949 | 7/1986 | Hill | 280/797 |

FOREIGN PATENT DOCUMENTS

| | | | |
|---|---|---|---|
| 0369358 | 5/1990 | European Pat. Off. | 280/789 |
| 2394436 | 2/1974 | France | 280/781 |

*Primary Examiner*—Margaret A. Focarino
*Assistant Examiner*—Paul Dickson
*Attorney, Agent, or Firm*—Harlan P. Huebner

[57] ABSTRACT

A truck trailer for transporting a structure over land that includes a frame having a low bed shelf for receiving transport platforms upon which said structure is secured wherein the height of the shelf is less than the height of the tires of the trailer wherein the height profile of the structure is reduced for both stabilization of the load on said frame as well as convenience of travel.

3 Claims, 2 Drawing Sheets

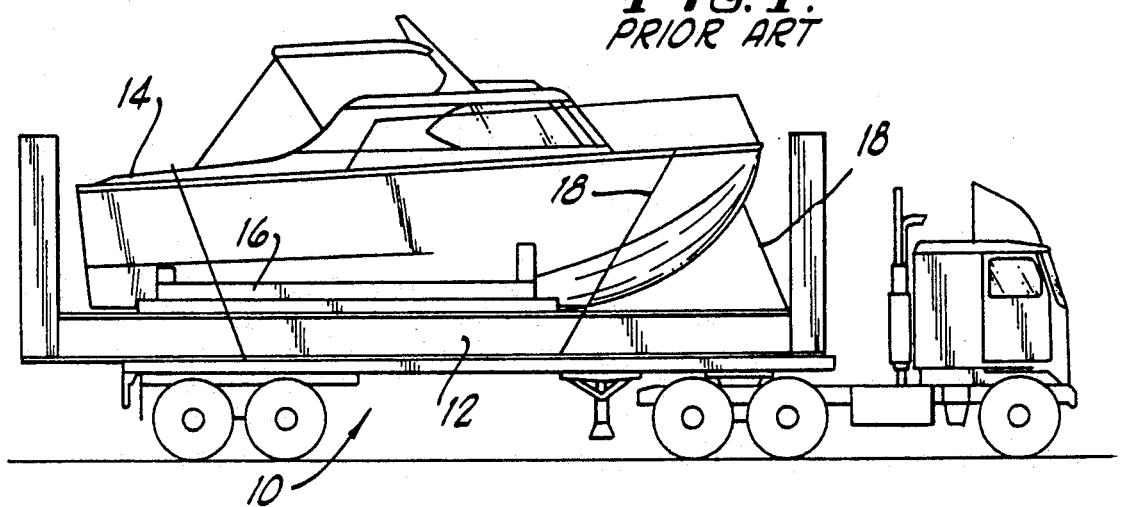

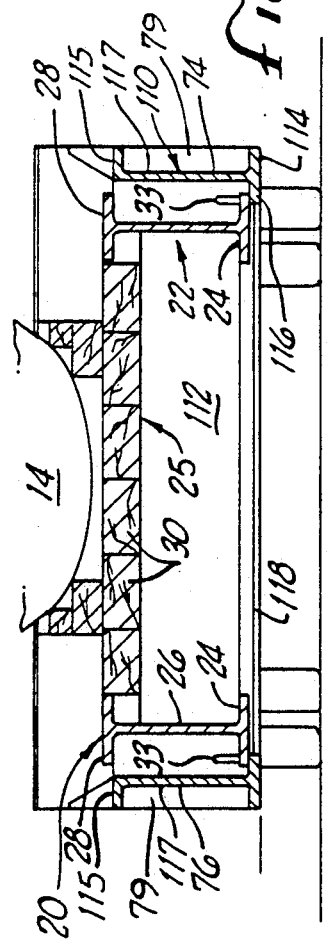
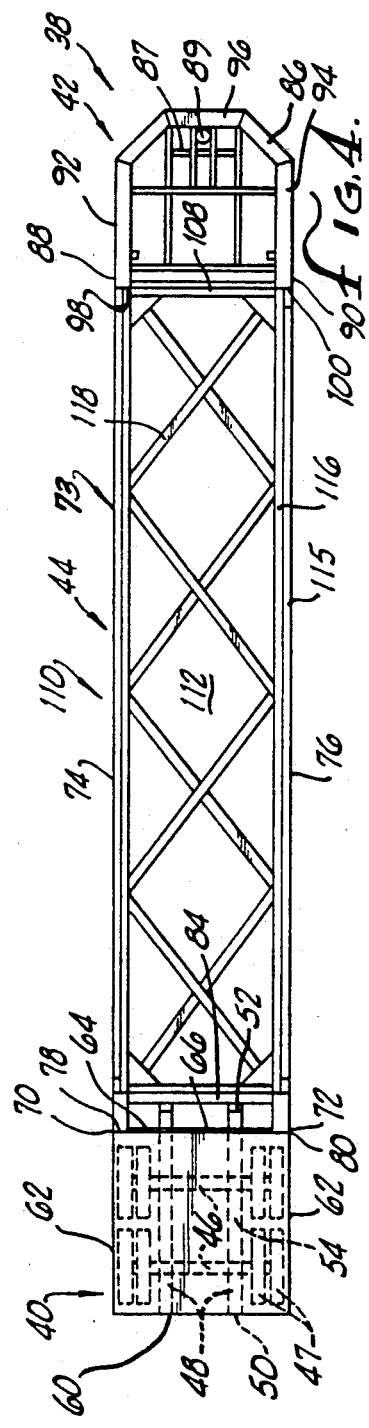
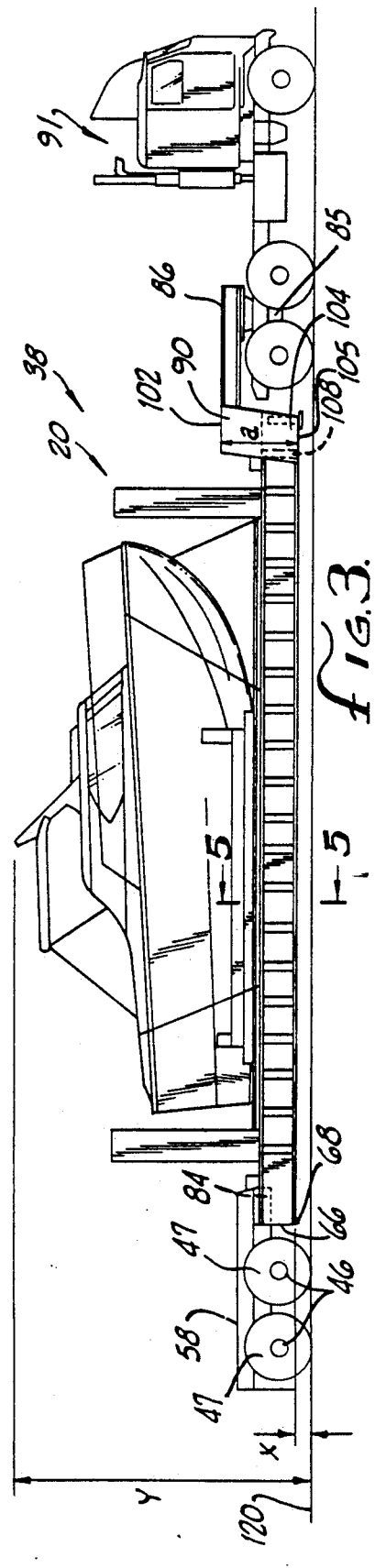

LOW BED OVERSIZED TRAILER

This is a continuation of application Ser. No. 07/635,690, filed Dec. 27, 1990, now abandoned.

BACKGROUND OF THE INVENTION

1. Field of the Invention

This invention relates to a truck trailer having a special bed constructed for receiving containers in which aquatic vessels and other items are secured for transport over land.

2. Background of the Invention

The primary structure by which aquatic vessels or other taller articles have been transported over land is by securing the boat to the bed of a flat bed truck trailer. To prevent the boat from tipping over, a scaffolding has usually been constructed around the keel of the boat to lend support. Straps have been used to secure the boat to the scaffolding. In addition, the boat and the scaffolding have been secured to the conventional flat bed of the trailer by cables. The cables are carefully positioned opposite of each other to help keep the boat balanced.

Unfortunately, the transportation of boats over land has been plagued by several problems. One of the problems has been the height of the load after the vessel has been secured to the bed of the truck. In most cases, the bed of the truck, which sits over the tires, is approximately five feet in height above the road. When the vessel is secured to the bed, the center of gravity of the vessel is substantially raised. The raising of the center of gravity can be dangerous because it adds to the instability of the load when the truck makes turns. Moreover, during an emergency traffic maneuver, the additional instability caused by the height of the load could prove to have tragic consequences.

The added height of the boat sitting on the bed of the conventional truck can also present practical problems in transporting the vessel. For example, when the truck must pass under some structure such as a freeway overpass, the additional height in some cases will be enough to force the truck to take an alternate route.

The present invention mitigates the problems presented by the height of the conventional flat bed truck by reducing the height of the bed from five feet to approximately eight to fourteen inches above the road. The difference of over four feet greatly reduces the center of gravity of the load thereby making it safer and also reduces the height of the load to allow the truck to pass under some structures that it otherwise would be forced to circumvent.

Another limitation of the conventional method of transporting vessels relates to the fact that the procedure for securing the vessel to the flat bed truck is time consuming and is resource inefficient. The traditional approach requires that a flat bed trailer be available before the vessel can be secured for the trip. The present invention does not require the presence of a flat bed trailer because the vessel is secured to a transport platform; not the trailer. This new approach saves time because the vessel is secured to the transport platform before the truck trailer arrives. When the trailer does arrive, the transport container is lowered by crane on to the trailer, at which point the vessel is ready to leave for its destination. This procedure is also more resource efficient because less expensive transport platforms await the arrival of truck and trailer instead of having trailers sitting idle with vessels on them awaiting the arrival of a truck.

SUMMARY OF THE INVENTION

It is the purpose of the present invention to provide a truck trailer having a low bed so that vessels or other produces transported on the bed will have a lower center of gravity thereby reducing the risk of the vessel tipping over during transport.

Another object of the present invention is to provide a truck trailer having a bed for receiving a special shipping platform to which a vessel or other product has been secured.

Another object of the present invention is to provide a truck trailer that can transport aquatic vessels or other products without having to tie the vessel to the trailer.

It is still another object of the present invention to provide a truck trailer that lowers the overall height of the vessel or other product being transported so as to allow the load to pass under overhead structures.

These and other objects and advantages will become apparent form the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 1 is a side elevational view of the vessel sitting on a transport platform that has been secured to a conventional flat bed trailer;

FIG. 2 is an elevate side view of a conventional transport platform;

FIG. 3 is a side elevational view of a vessel secured to a transport platform that has been placed on the trailer of the present invention;

FIG. 4 is a top view of the trailer of the present invention; and

FIG. 5 is a cross-sectional view taken along line 5—5 of FIG. 3.

DETAILED DESCRIPTION OF THE PREFERRED EMBODIMENT

FIG. 1 illustrates a prior art truck trailer generally designated 10 on which a transport platform 12 and vessel 14 have been secured. A conventional vessel support structure 16 helps prevent the vessel from tipping over. Conventional straps 18 secure the vessel to the trailer 10 and also help keep the vessel balanced. As can be seen, the supporting structure of the prior art is well above the trailer wheels, thus creating an extremely high center of gravity for the vessel or boat 14.

FIG. 2 depicts a conventional transport platform or pallet generally designated 20. The essential features of the transport platform 20 are two spaced apart relatively large steel I beams designated 22 which form the sides of the platform 20. Each I beam, as best seen in FIG. 5, includes a bottom flange 24 a web section 26 and a top flange 28.

Extending between the top flanges 28 is a platform surface 25 preferably made up of a number of wood planks 30. In addition, there are usually provided front and rear end walls 31 and 32 vertically projecting from the platform 20. They may be of any conventional material which would deter damage to the front or rear of the vessel 14 when the platform is on the ground.

Welded to the bottom flange 28 are a plurality of lifting loops 33. Cables (not shown) are secured to the loops 33 for lifting the transport platform 20 on to a truck trailer.

Formed in the surface 25 and the I beam 22 in the area of the top flange 28 are tie down cut outs 34 with tie down bars 36. The tie down bars 36 are used to strap the vessel down on the platform 20 with the anchor straps 18.

The improvement that constitutes the present invention is found in the design of the truck trailer generally designated 38 in FIG. 4. The truck trailer 38 has a rear portion 40, a front portion 42, and a mid-section 44.

The rear portion 40 includes a conventional pair of axles 46 and wheels 47. The rear portion also includes two parallel support members 48. Each support member 48 is secured to the axles 46 such that the axles 46 and support members 48 are perpendicular to each other. Each support member 48 has a first end 50, a top side 54, and a second end 52.

In the preferred embodiment, the vertical thickness of the support member 48 should be greater than half the height of the wheels 47. Also in the preferred embodiment, a rear flat bed platform 58 is secured to the top side 54 of the support member 48. The rear flat bed 58 provides a cover for the rear wheels 47 and axles 46 and increases the structural integrity of the overall rear portion 40. The rear flat bed 58 has a rear edge 60, two side edges 62, and a front edge 64.

Extending from the front edge 64 of the rear flat bed 58 is a brace plate 66. The brace plate 66 is substantially perpendicular to the plane of the rear flat bed 58 and extends downwardly from the flat bed 58. The brace plate 66 includes a bottom edge 68. The brace plate 66 should extend downwardly from the plane of the rear flat bed 58 until the bottom edge 68 is preferably approximately ten inches from the ground. The brace plate 66 also includes a first side edge 70 and a second side edge 72, the significance of which will be discussed below. In addition, the brace plate is penetrated by the support members 48. As will be seen, the support members 48 project through the brace plate 66 so that they can add to the structural integrity of the midsection 44.

The midsection 44 includes a low bed 73 with a first support girder 74 and a second support girder 76. The first girder 74 is welded or otherwise secured to the rear brace plate 66 in a manner so that the first girder 74 is perpendicular to the rear brace plate 66. The location at which the first girder 74 is secured to the rear brace plate 66 is important to the proper functioning of the invention. Specifically, first girder 74 should be secured to the rear brace plate 66 in a location proximal to the first side edge 70 and to the bottom edge 68.

Just as with the first girder 74, the second girder 76 is also welded to the rear brace plate 66 in a manner so that the second girder 76 is perpendicular to the rear brace plate 66. The location at which the second girder 76 is secured to the rear brace plate 66 is also important to the proper functioning of the invention. Namely, the rear end 80 of the second girder 76 should be secured to the rear brace plate 66 in a location proximal to the second side edge 72 and to the bottom edge 68.

The second girder 76 is secured to the rear brace plate 66 the same distance from the bottom edge 68 as is the first girder 74. Otherwise, the load will tilt to one side or the other thereby creating unsafe distribution of the load.

In order to add strength to each girder a plurality of vertical strengthening gussets 79 are preferably provide on the outside of the girders 74 and 76.

One should also note that the closer the first and second girders 74 and 76 are secured to the bottom edge 68 of the rear brace plate 66, the more effective the invention will function in reducing the height of the load. Furthermore, the first girder 74 and second girder 76 should be space apart from each other a sufficient distance for the transport platform 20 to fit between them.

The low bed midsection 44 also includes a rear beam 84. The rear beam 84 passes between the first girder 74 and the second girder 76 and is secured to each girder. The beam 84 is further positioned so that it abuts against the first end 52 of each support member 48 of the rear portion 40. In this way, the support members 48, which are positioned over the rear axles 46, are secured to the rear cross beam 84, which is secured to the first and second girders 74, 76, thereby increasing the structural integrity of the mid-section 44 that will support the weight of the load.

The front portion 42 of the invention includes a horse shoe frame designated 86, a first girder support means 88, and a second girder support means 90. The horse shoe frame 86 is positioned a sufficient distance from the ground so that a truck tractor 91 having a conventional fifth wheel assembly 85 may back underneath the frame 86. The frame includes a support structure 87 that serves to support a kingpin 89. The support structure 87 also adds to the structural integrity of the frame 86. The kingpin 89 serves to hook the trailer to the fifth wheel assembly 85.

The horse shoe frame 86 also includes a right leg 92 and a left leg 94. The legs 92, 94 are parallel to each other and spaced space apart the same distance as the first and second girders 74 and 76. The right leg 92 and left leg 94 are connected by a web 96.

Each girder support means 88, 90 has a top portion 102 and a bottom portion 104. The bottom portion 104 has a bottom surface 105. The top portion 102 of the first girder support means 88 is welded perpendicularly to the right leg 92, and the top portion 102 of the second girder support means 90 is welded perpendicularly to the left leg 94. Both first and second girder support means 88, 90 have a length "a". The length "a" is predetermined so that when the trailer 38 is hooked to a truck tractor 91, then the bottom edge 105 will be the same distance from the ground as the bottom edge 68 of the brace plate 66 of the rear portion 40 of the invention.

The first girder 74 is secured to the bottom portion 104 of the girder support means 88. When the elongated first girder 74 is secured to the first girder support means, it should be the same distance from the bottom edge 105 as the rear end 78 is from the bottom edge 68 of the rear brace plate 66. This is important to insure that the vessel does not tilt forward or backward. The second girder 76 is secured in the same manner as the first girder is secured to the first girder support means.

The mid-section 44 of the invention also includes a front beam 108. The front beam 108 passes between the first girder 74 and the second girder 76 and is perpendicular to both. The point at which the front beam 108 is attached to the two girder support means 88, 90 is important. The front beam 108 should be the same distance from the bottom surface 105 of each girder support means 88, 90 as the front end 98 of the first girder 74 is from the bottom surface 105. In this way, the front beam 108 lies in the same plane as the first girder 74, second girder 76, and rear beam 84.

Collectively, the two girders 74, 76 and two beams 84, 108 define a fixed length and width rectangular frame. The frame defines an interior space 112. The frame 110 itself has a bottom rim 114. A support flange 116 projects from the girder 76 of the frame 112 into the interior space 112. The flange 116 is perpendicular to the frame 110. In the preferred embodiment, the flange 116 is eight to fourteen inches from the ground.

As a practical matter, the frame 110 is formed by conventional I beams that have been modified. There is a horizontal top flange 115 that projects outward of the web 117 for each girder 74 and 76. There is no inner flange. In the present invention, the horizontal top flange of the "I" has been modified by removing the portion that projects into the interior space 112. The resulting structure is shown in cross-section as part of the frame 110 in FIG. 5. Once the I beams that form the frame have been modified, the transport platform 20 may be lowered by crane into the interior space 112 and come to rest on the flanges 116 as best shown in FIG. 5. At that point, the vessel 14 is ready to be transported. To add to the structural integrity of the invention, cross tie members 118 connect the girders 74, 76 fixedly together. However, the cross members 118 do not support the weight of the transport platform 20.

As can be seen with the new trailer 20 the height "x" from road 120 to the bottom of the low bed section 44 is less than the distance from the road 120 to the axles 46. In this structure it can be seen that the overall height "y" from road 120 to the top of the vessel 14 is also reduced.

These and other objects and advantages will become apparent from the following part of the specification wherein details have been described for the competence of disclosure, without intending to limit the scope of the invention which is set forth in the appended claims.

I claim:

1. A truck for receiving a pallet upon which a structure having a relatively high profile is secured for transportation and storage, wherein said trailer is constructed to reduce said profile and the same comprises:

an elongated permanently fixed length and width low bed pallet receiving frame including a front and rear end and parallel single side members permanently fixed in width one from the other each having a bottom surface and each having inwardly extending pallet receiving co-planar flanges permanently fixed one from the other and a front and rear end, said side members also having top co-planar surfaces vertically spaced above said flanges;

a rear wheel platform member having a top surface, said platform member integral with said frame and stepped down to said rear end of said frame, said top surface of said platform member vertically spaced above said top co-planar surfaces of said frame, and at least a pair of wheels and an axle therebetween secured to said platform member;

a front platform member having a top area, said front platform member integral with said front end of said frame and said front platform member stepped down to said front end of said frame, said top area vertically spaced above said top co-planar surfaces of said frame and means within said top area to secure said trailer to a truck;

a plurality of cross tie members extending between said side members below an upper surface of said pallet receiving co-planner flanges, said tie members imparting structural rigidity and integrity to said trailer; and said flanges permanently fixed at a height above a surface said wheels rest on but less than the height of said axle of said wheels from said surfaces, whereby said structure height is reduced for stability and convenience of movement along a roadway.

2. The truck trailer of claim 1 wherein said bottom surface of said side members is between eight and fourteen inches above a surface upon which said trailer sits.

3. The truck trailer of claim 1 wherein said inwardly extending flanges are secured to said side members at a point below said top surface whereby said pallet may rest on said flanges while said side members prevent lateral movement of said pallet.

* * * * *